United States Patent
Grzegorzewski et al.

(10) Patent No.: US 6,644,708 B1
(45) Date of Patent: Nov. 11, 2003

(54) RECONFIGURABLE DROP PANELS FOR A VEHICLE CARGO BED

(75) Inventors: Bruce M Grzegorzewski, Warren, MI (US); Randy C Curtis, Macomb, MI (US); Mark R Moore, Holly, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/235,110

(22) Filed: Sep. 5, 2002

(51) Int. Cl.⁷ ............................................. B62D 33/027
(52) U.S. Cl. ..................... 296/32; 296/26.15; 296/10; 296/100.06
(58) Field of Search ................. 296/26.06, 26.15, 296/32, 36, 51, 10, 100.06, 37.6

(56) References Cited

U.S. PATENT DOCUMENTS

| | | | | |
|---|---|---|---|---|
| 1,393,169 A | * | 10/1921 | Schlatter et al. | 296/51 |
| 2,742,317 A | * | 4/1956 | Chandler | 296/51 |
| 3,768,858 A | * | 10/1973 | Boismier | 296/10 |
| 4,098,414 A | * | 7/1978 | Abiera | 296/36 |
| 4,531,775 A | * | 7/1985 | Beals | 296/26.06 |
| 4,842,317 A | * | 6/1989 | Moore | 296/36 |
| 5,788,307 A | * | 8/1998 | Gilbert | 296/32 |
| 5,816,638 A | | 10/1998 | Pool, III | 296/26.11 |
| 5,997,067 A | * | 12/1999 | Shambeau et al. | 296/36 |
| 6,019,410 A | | 2/2000 | Trostle et al. | 296/26.11 |

FOREIGN PATENT DOCUMENTS

| | | | | |
|---|---|---|---|---|
| DE | 2440504 | * | 4/1975 | 296/36 |
| GB | 2219258 | * | 12/1989 | 296/36 |

OTHER PUBLICATIONS

Engineering News, May 29, 1919, vol. 82, pp. 1081–1082, "Combination Detachable Truck-Body Serves Several Purposses".*

* cited by examiner

Primary Examiner—Dennis H. Pedder
(74) Attorney, Agent, or Firm—Laura C. Hargitt

(57) ABSTRACT

A vehicle cargo bed has reconfigurable drop side and tail panels. Tail lights are incorporated within the reconfigurable panels. Each side panel is hinged with respect to the cargo bed so that the side panel can pivot downwardly to a cargo bed widening horizontal position or upwardly to a vertical or horizontal position spaced from the cargo bed. The cargo bed includes a storage box accessible through the side entrance. The side panel may also be hinged with respect to itself to form a lip or small restraining wall.

16 Claims, 3 Drawing Sheets

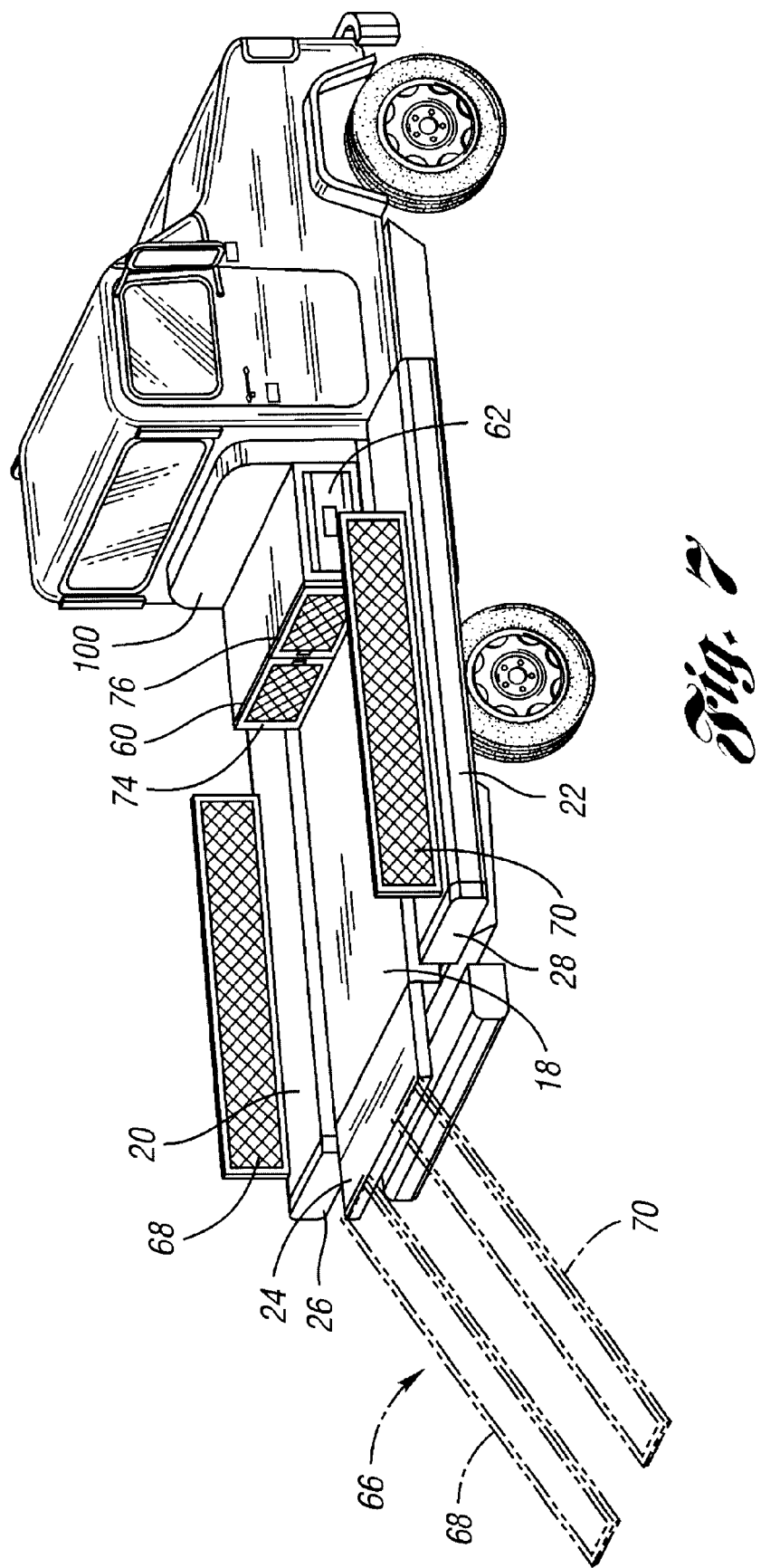

RECONFIGURABLE DROP PANELS FOR A VEHICLE CARGO BED

TECHNICAL FIELD

This invention relates to a vehicle cargo bed having reconfigurable drop side and tail panels.

BACKGROUND OF THE INVENTION

Pick-up trucks are vehicles having cargo beds used for carrying many things. Such cargo beds have a tailgate which hinges downwardly to load the truck bed. The side panels generally remain fixed and add to the difficulty of loading appliances, large structures and smaller powered vehicles onto the cargo bed.

The need exists for a vehicle which can be quickly and easily loaded. Accordingly, there is a need for a fully reconfigurable drop paneled vehicle which may include an optional side entrance to the cargo bed with several options, such as access to a tool box and drive-on loading, as features of the cargo bed vehicle. There is also a need for a fully reconfigurable drop paneled truck for commercial and industrial applications.

SUMMARY OF THE INVENTION

This invention relates to a truck cargo bed-having reconfigurable drop side and tail panels. Each side panel is hinged with respect to the cargo bed so that the side panel can pivot downwardly to a cargo bed widening horizontal position, or upwardly to a vertical or inwardly horizontal position spaced from the cargo bed to form a side entrance to the cargo bed and/or tool box and to act as a shelf. The cargo bed may include a storage or tool box accessible through the side entrance. The side panel may also be articulated or hinged with respect to itself to form a lip or small retainer wall.

Another feature of this invention is a ramp which may be a removable attachment in a stowed position on either the inside or the outside of one of the side panels. The ramp is moved from its stowed position to a sloped-to-the-ground use position for supporting the wheel or wheels of an ATV being driven onto the cargo bed quickly and easily. The ramp is connected to either the tailgate or a side panel with a hook-and-pocket arrangement after being moved from its stowed position to its use position.

Accordingly, this invention relates to a vehicle body which has a passenger compartment and a cargo bed. The cargo bed has a plurality of upstanding side panels which define at least two sides of the cargo bed. At least one of the upstanding side panels has at least a portion of the side panel pivotable about more than one axis with respect to the cargo bed to achieve either a wider cargo bed or side access to the cargo bed.

The side panels are enabled to swing outboard instead of being fixed to the bed, will be functional within 180–190 degree arc, and are positionable either vertically or horizontally with respect to the ground. The invention also relates to a cargo box which can serve as a sub-assembled option of predetermined size for a vehicle add-on after manufacture of the vehicle. This would most ordinarily be at the dealer where the vehicle is purchased. The cargo bed on the cargo box has a plurality of upstanding side panels less than two feet in height and hingedly connected to the cargo bed for swinging movement from upstanding to horizontal and sufficient in height so that in combination with the width of the cargo bed, when the side panels are horizontal, to be within allowable vehicle regulations. The side panels carry ramp portions which are repositionable to hang from either the tailgate or the side panel to provide a ramp suitable for driving powered vehicles (i.e., ATV's) onto the cargo bed.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 7 is right, rear perspective of the vehicle of this invention with a ramp member on each side panel, removable from the solid line position as shown to a phantom line position descending from the tailgate as a ramp pair sloped-to-the-ground.

DETAILED DESCRIPTION OF THE PREFERRED EMBODIMENT

Figure 1:
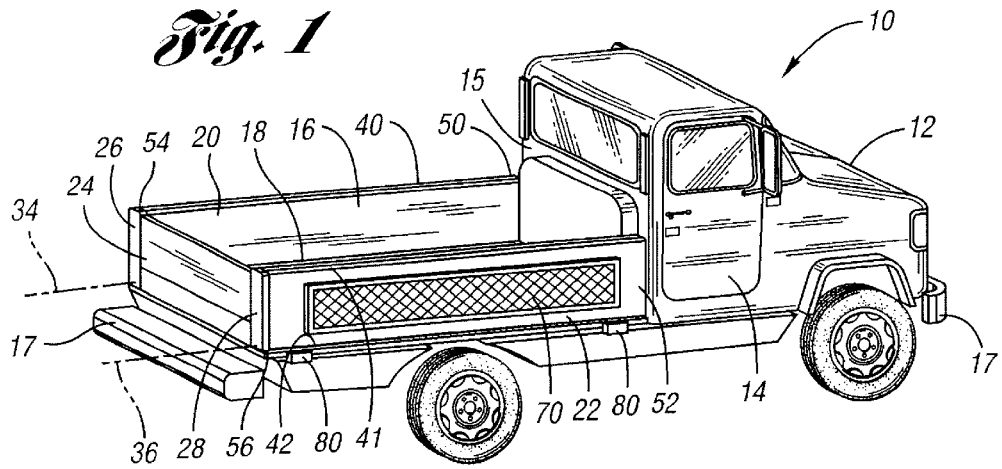
FIG. 1 is a right, rear perspective view of a vehicle with the cargo bed and removable ramp of this invention.
Figure 2:
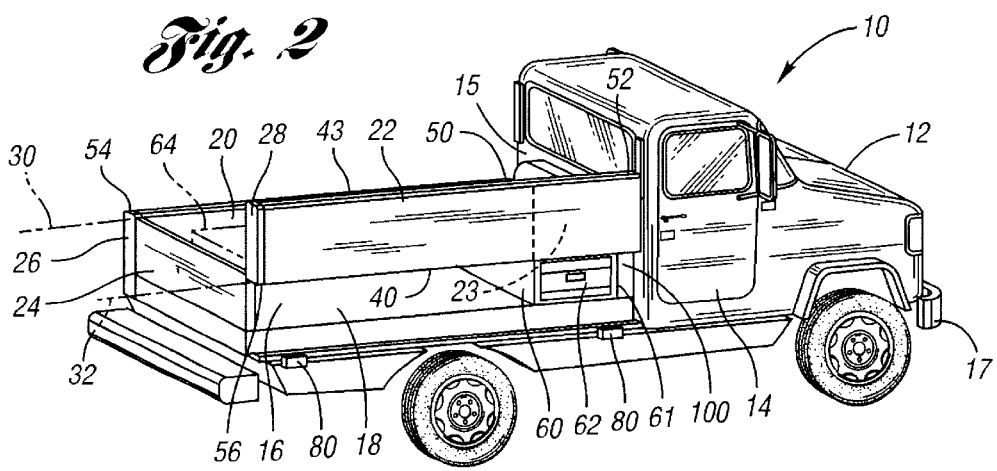
FIG. 2 is a right, rear perspective view of a vehicle of this invention with a side panel pivoted into a vertically raised position for side access to the cargo bed and a tool box thereon (solid line) and further pivoted inwardly to a horizontal position (phantom line) for at least partially covering a cargo bed.

FIGS. 1 and 2 show a vehicle 10. The vehicle 10 has a vehicle body 12 including a passenger compartment 14 and a cargo compartment 16 and bumpers 17. The cargo compartment 16 has a cargo bed 18, two side panels 20, 22, and a tailgate 24. The side panels 20 and 22 define the two sides of the cargo bed and support tail lights 26, 28 at the rear of the side panels.

Figure 3:
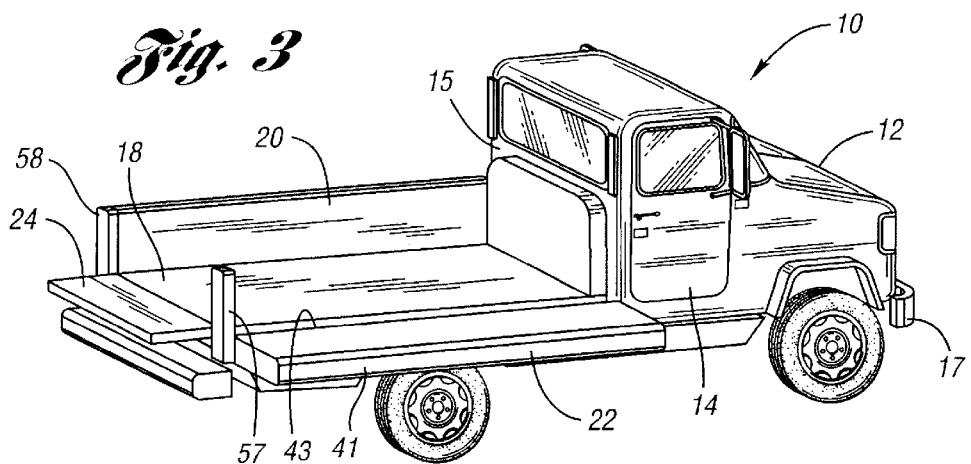
FIG. 3 is a right, rear perspective view of a vehicle of this invention showing the cargo bed with a side panel and tailgate pivoted downwardly to widen and elongate the cargo bed.
Figure 4:
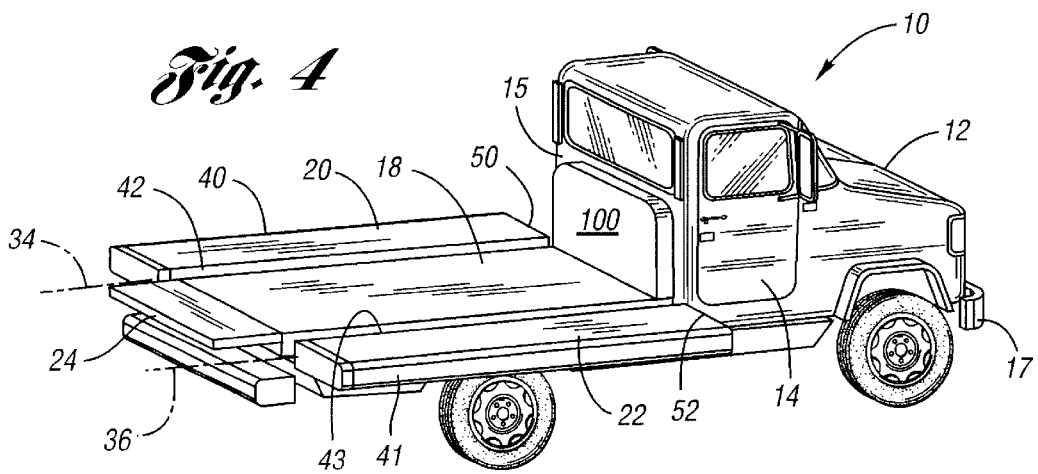
FIG. 4 is right, rear perspective view of a vehicle of this invention showing both side panels pivoted downwardly into a horizontal position expanding the width of the cargo bed.

Each of the side panels 20, 22 is pivotable about an upper axis 30, 32 in the back wall or bulkhead 15 of the passenger compartment at the top of the each side panel (FIG. 2) and about a lower axis 34, 36 in the back wall 15 of the passenger compartment at the lower edge 42 of the side panels 20, 22 (FIGS. 1 and 4). Thus, each side panel 20, 22 is pivotable about more than one axis with respect to the cargo bed 18. Each panel's upper edge 40 substantially defines the top axis 30, 32 and the panel lower edge 42 defines the lower axis 34, 36. Side panels 20, 22 will pivot with respect to the vehicle body 12 at the front 50 and 52 of the side panels along the back wall 15 of the passenger compartment. Side panels 20, 22 will pivot with respect to the tailgate 24 at the rear 54, 56 of the side panels (FIGS. 1 and 2). Tail lights 26, 28 are incorporated within the reconfigurable panels and may be detachable. Alternatively, side panels 20, 22 will pivot with respect to a fixed post 57, 58 (FIG. 3) which could then carry tail-lights such as 26, 28 as part of the post. The tail-lights normally have a vertical theme but can be used in either a vertical or horizontal position of the reconfigurable side panel. Government regulations will determine the possibilities for tail light location and detachment.

One skilled in the art will recognize that the pivotal movement about the upper and lower axes 30, 32, 34, 36 may be facilitated by a variety of different means. For example, spring loaded pivot pins may be selectively engaged and disengaged at the corners of the side panels to facilitate the pivotal movement about the upper and lower axes.

FIG. 3 shows the side panel 22 and tailgate 24 pivoted downwardly into a position substantially coplanar and horizontal with the cargo bed 18. Side panel 20 is in its vertical position. FIG. 4 shows both side panels 20 and 22 and tailgate 24 pivoted downwardly to define a broadened and lengthened cargo bed that in combination can be configured with the height dimensions of the side panels 20, 22 and the width dimension of the cargo bed 18 to meet allowable vehicle width regulations. In this regard, the side panels are less than two feet in height. This enables the combination to meet allowable body width regulations and still provide enlarged hauling capacity with the side panels extending outboard. The maximum width with both side panels in the open flat-bed configuration is seven feet as measured cross-vehicle. Larger floor bed configurations depend on allowable regulations.

One or both of the side panels 20 and 22 may be hollow or include an internal cavity as a fuel tank which can be conveniently located and manually accessed to fill a camper's need for fuel. This feature eliminates the need to carry extra portable fuel cans in the cargo compartment 16.

Figure 6:
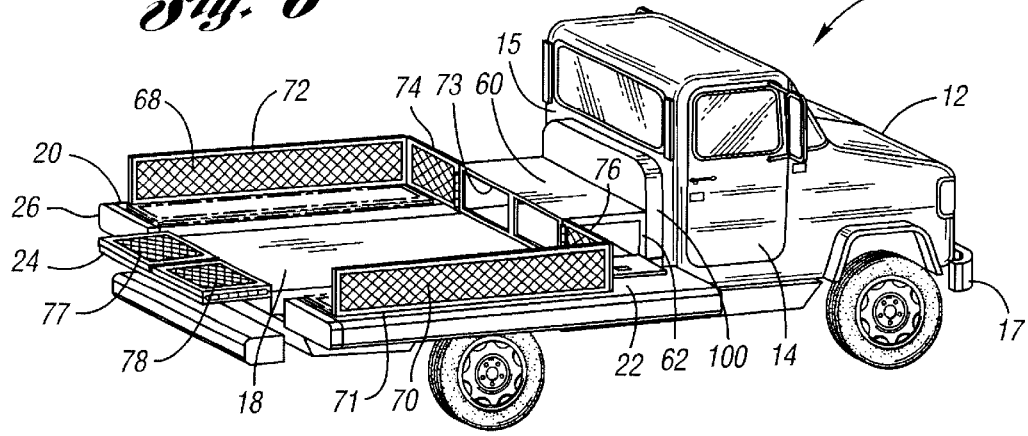
FIG. 6 is a right, rear perspective view of a vehicle of this invention showing rearwardly and sidewardly opening tool box doors on the cargo bed with truck side panels carrying upwardly pivoted ramp members to form an enlarged cargo bed with the sidewardly opening tool box doors.

FIGS. 2, 6 and 7 show a toolbox or storage box 60 on the vehicle body at the forward end of the cargo bed 18. The toolbox is configured with a side access 61 having side drawers or pivotable access doors 62. The storage box can be integrated into the vehicle bulkhead 15 or the front wall 100 of the cargo bed. Either side panel 20, 22 may be apportioned along its longitudinal length so that only that access panel portion 23 (phantom) of side panel 22 in FIG. 2, for instance, that is adjacent to the side access doors 62 of the tool or storage box 60 will need to be pivotably raisable. Thus, the pivoting of access panel portion 23 swings outwardly and upwardly about axis 32 to form the access opening to the cargo bed at the site of the tool or storage box doors 62 while the remainder of side panel 22 remains in place as shown in FIG. 1. Such an arrangement provides improved access to the storage box without pivoting the entire side panel. The storage box will have access, of course, when the entire side panel 22 is lowered to its horizontal position or when the entire side panel is raised vertically. Closing and locking the side panels will serve as a securing feature to that portion of the cargo compartment which houses the tool or storage box. The storage box may also accommodate sliding trays for easy access to tools or the like.

With reference to FIG. 2, side panel 20 and/or side panel 22 or portions 23 thereof may be pivoted about the upper axes 30, 32 to swing outwardly, upwardly and inwardly to form a shelf or cargo bed cover 64 over the tool or storage box 62 and/or the cargo bed 18. The height of front wall 100 will, of course, be shortened to underlay panel 22 as a support when the panel is formed as a shelf.

FIG. 7 shows a ramp 66 (in phantom) which provides drive-up access by the user for loading powered vehicles such as ATV's, water craft and motorcycles. Ramp 66 is comprised of two ramp portions 68, 70. Each ramp or wall portion 68, 70 is carried on a respective side panel 20, 22. The ramp portions can be removably carried on either-the inside (FIG. 7) or the outside (FIG. 1) of the side panels. The ramp 66 is formed by removing the ramp portions 68, 70 from their respective side panels and by installing them in a declining manner from the back of the open tailgate 24. Hooks (not shown) on the ramp portions interfit with pockets (not shown) on the tailgate to form a hook-and-pocket connection between ramp portion and tailgate to complete the installation of the ramp on the truck.

Where the ramp portions 68, 70 are normally removably carried on the inside or outside of the side panels 20, 22, they may also be hinged to the side panels as seen in FIG. 6. The ramp portions can then be pivoted upwardly to become a retainer wall at the outer edge of an expanded cargo bed.

As further shown in FIG. 6, the cargo bed may be further enclosed by providing the tool box or storage box with a rearwardly opening access 73 and rear doors 74, 76 for closing the opening. These storage box doors are hinged so that they are outwardly pivotable to connect with the also hinged and pivotably raiseable ramp or wall portions 68, 70. These two hinging actions form a retainer wall which encloses the front and sides of the cargo bed 18. Rear wall door portions 77, 78 may also be hingedly added to the tailgate 24. Thus, with the tailgate 24 closed, the added doors 77, 78 may then be swung outwardly to connect with the hingedly raised ramp or wall portions to completely close the periphery of the cargo bed 18.

Figure 5:
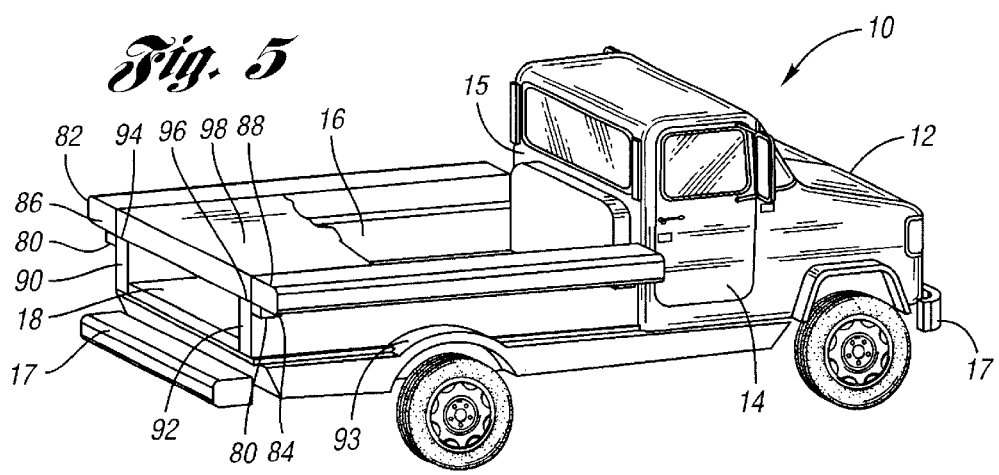
FIG. 5 is a right, rear perspective view of a vehicle of this invention showing a side panel hinged at a mid-point longitudinally to form a lip or ledge at the top of each side panel for supporting a raised secondary cargo bed or cover.

With reference to FIG. 5 the vehicle body 12 includes structural shelf portions 80 and foldable side panels 82, 84. Each foldable side panel is divided longitudinally so that an upper side panel portion 86, 88 can be pivoted or hinged with respect to a lower side panel portion 90, 92. In this arrangement, the shelf is used to support the underside of its respective upper side panel portion. The wheel well 93 may also be formed as a structural support shelf for the reconfigurable panels. A notch or fold-over ledge 94, 96 is formed when the upper side panel portions are folded. This ledge may support a secondary cargo bed cover 98 which in effect becomes a raised additional cargo bed.

The foldable side panels 82 and 84 can also be hinged to provide for the upper side panel portions to pivot in the opposite direction from that shown in FIG. 5. With such an arrangement in the FIG. 4 embodiment, the pivoted upper side panel portions would form an upstanding lip so that in the horizontal FIG. 4 position of the side panels 20, 22, the lip would act as a small restraining wall and add structural strength to each side panel.

This invention also contemplates a four foot box bed as a sub-assembled option for a vehicle add-on after manufacture. The box would include a shorter version of a cargo bed 18 and is made of either steel or composite material. The box bed and side panels can be sub-assembled at the point of and after vehicle sale (dealerships) or made part of general assembly. The box bed would include sufficient adjustable features to facilitate universal application fit to other different vehicle frames and could include a front wall portion 100 that would abut the back wall or bulkhead 15 of the passenger compartment.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A vehicle body comprising:

a passenger compartment;

a cargo bed having a tailgate;

an upstanding side panel defining a side of the cargo bed extending from said tailgate to said passenger compartment; and the upstanding side panel having at least one portion of the side panel pivotable about an upper pivot axis and a lower pivot axis with respect to the cargo bed wherein the one portion of the side panel is pivotable about the upper pivot axis by swinging outwardly and upwardly to a vertical position with respect to the cargo bed.

2. The vehicle body of claim 1, wherein the one portion of the side panel has an upper edge substantially defining an upper pivot axis and a lower edge substantially defining the lower pivot axis.

3. The vehicle body of claim 2, wherein the one portion of the side panel pivots about the lower axis by swinging outwardly and downwardly to a horizontal position with respect to the cargo bed to widen the cargo bed.

4. The vehicle body of claim 3, wherein the one portion of the side panel is pivotably connected with respect to the cargo bed for enabling the one portion for swinging outwardly through an arc to the horizontal position.

5. The vehicle body of claim 4 including a structural shelf integral with the body and in-line with the arc for supporting the one portion after the one portion swings through the arc.

6. The vehicle body of claim 2 including a storage box having a side access and wherein the pivoting of the one portion of the side panel about the upper pivot axis swings the one portion outwardly and upwardly to form an access opening to the cargo bed and the side access of the storage box for access to the storage box.

7. The vehicle body of claim 6 wherein the pivoting of the one portion of the side panel about the upper pivot axis swings the one portion outwardly, upwardly and inwardly to form a shelf over the storage box or a cargo bed cover over the cargo bed.

8. A vehicle body comprising:

a passenger compartment;

a cargo bed;

a pair of upstanding side panels defining at least two sides of the cargo bed and extending along both sides to said passenger compartment; and at least one of the upstanding side panels having at least one portion of the one side panel pivotable about an upper pivot axis and a lower pivot axis with respect to the cargo bed and the passenger compartment, wherein the one portion of the side panel is pivotable about the upper pivot axis by swinging outwardly and upwardly to a vertical position with respect to the cargo bed, and wherein the one portion of the side panel is pivotable about the lower pivot axis by swinging outwardly and downwardly to a horizontal position to widen the cargo bed.

9. The vehicle body of claim 8, wherein the heights of the pair of upstanding side panels in combination with the width of the cargo bed in an open flat-bed configuration is substantially seven feet as measured across the width for a vehicle body when the pair of side panels are pivoted downwardly about the lower pivot axis.

10. The vehicle body of claim 1, wherein the side panel is a fuel tank.

11. The vehicle body of claim 8, wherein at least one of the side panels includes a ramp portion removable and repositionable with respect to the cargo bed to provide a ramp suitable for driving powered appliances onto the cargo bed.

12. A vehicle body comprising a cargo compartment, a pair of upstanding side panels defining at least two sides of the cargo bed and being pivotable with respect to the cargo bed to a horizontal position, a storage box on the cargo bed and a pair of side wall portions respectively pivotally openable on each of the upstanding side panels, the storage box having a rearwardly opening access door outwardly pivotable to connect with a pivotally open side wall portion to at least partially enclose the periphery of the cargo bed.

13. The vehicle body of claim 12, including an openable and closable tailgate having a rear wall portion pivotally attached thereto and pivotable when the tailgate is closed to further enclose the periphery of the cargo bed.

14. A vehicle body comprising:

a passenger compartment;

a cargo bed;

an upstanding hollow side panel defining a side of the cargo bed; and the upstanding hollow side panel having at least one portion of the side panel pivotable about more than one axis with respect to the cargo bed, and wherein the hollow of the upstanding side panel is a fuel tank.

15. The vehicle body of claim 8, wherein each of the pair of side panels has an upper side panel portion and a lower side panel portion, wherein the upper side panel portion is pivotable with respect to the lower side panel portion to form a ledge on opposite sides of the cargo bed, the vehicle body including a cargo bed cover supported at each side on the ledge above the cargo bed.

16. The vehicle body of claim 3, including a shelf for supporting the one portion of the side panel when the one portion of the side panel has pivoted about the lower axis from upstanding.

* * * * *